US012380817B1

(12) United States Patent
Troell

(10) Patent No.: US 12,380,817 B1
(45) Date of Patent: Aug. 5, 2025

(54) DECORATIVE DOOR PANEL INSERT

(71) Applicant: Josh Troell, Freeland, PA (US)

(72) Inventor: Josh Troell, Freeland, PA (US)

( * ) Notice: Subject to any disclaimer, the term of this patent is extended or adjusted under 35 U.S.C. 154(b) by 59 days.

(21) Appl. No.: 17/972,614

(22) Filed: Oct. 25, 2022

(51) Int. Cl.

| | |
|---|---|
| ***G09F 13/18*** | (2006.01) |
| ***F21S 4/00*** | (2016.01) |
| ***F21V 23/04*** | (2006.01) |
| *F21Y 115/10* | (2016.01) |

(52) U.S. Cl.
CPC ................ *G09F 13/18* (2013.01); *F21S 4/00* (2013.01); *F21V 23/04* (2013.01); *F21Y 2115/10* (2016.08); *G09F 2013/1836* (2013.01); *G09F 2013/1881* (2013.01)

(58) Field of Classification Search
CPC ............. G09F 13/18; G09F 2013/1836; G09F 2013/1881; F21S 4/00; F21V 23/04; F21Y 2115/10; E06B 3/5892; E06B 3/5872; E06B 3/822; E06B 3/72
See application file for complete search history.

(56) References Cited

U.S. PATENT DOCUMENTS 5,018,330 A 5/1991 Lewkowitz
6,029,411 A * 2/2000 Richardson ........... A47F 3/0434 49/504
6,059,420 A * 5/2000 Rogers .................... F25D 27/00 362/802
6,736,534 B1 * 5/2004 Fite ........................... E06B 7/30 362/253
D669,196 S 10/2012 Walsh
8,826,574 B2 9/2014 Eichner
9,664,835 B2 * 5/2017 Kleo ....................... A47F 11/10
9,677,756 B1 6/2017 Johnson
10,810,914 B2 * 10/2020 Sylvester ................ F25D 27/00
2002/0007576 A1 * 1/2002 Gai ..................... G09F 13/0413 362/812
2003/0230045 A1 * 12/2003 Krause, Sr. ............... E06B 7/28 52/204.593
2004/0016186 A1 * 1/2004 Larussi ..................... E06B 7/28 52/173.1
2005/0105303 A1 * 5/2005 Emde ................ B32B 17/10045 362/616
2007/0133192 A1 * 6/2007 Alessandro ........... A47F 3/0434 362/125
2010/0255227 A1 10/2010 Hisle
2011/0188250 A1 8/2011 Waldhuetter
2015/0335174 A1 * 11/2015 Artwohl .................. A47F 10/02 349/1
2016/0095450 A1 * 4/2016 Trulaske, Sr. .......... A47F 3/005 49/70

FOREIGN PATENT DOCUMENTS

CA 2011864 7/1994

* cited by examiner

*Primary Examiner* — Cassandra Davis
(74) *Attorney, Agent, or Firm* — Kyle A. Fletcher, Esq.

(57) ABSTRACT

The decorative door panel insert comprises a frame structure, an image panel, an illumination circuit, and a door. The image panel mounts in the frame structure. The illumination circuit mounts in the frame structure. The frame structure mounts in the door. The image panel displays an image. The illumination circuit illuminates the image panel. The image panel is a transparent structure.

7 Claims, 6 Drawing Sheets

DECORATIVE DOOR PANEL INSERT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of illuminated signs. (G09F13/00)

SUMMARY OF INVENTION

The decorative door panel insert comprises a frame structure, an image panel, an illumination circuit, and a door. The image panel mounts in the frame structure. The illumination circuit mounts in the frame structure. The frame structure mounts in the door. The image panel displays an image. The illumination circuit illuminates the image panel. The image panel is a transparent structure.

These together with additional objects, features and advantages of the decorative door panel insert will be readily apparent to those of ordinary skill in the art upon reading the following detailed description of the presently preferred, but nonetheless illustrative, embodiments when taken in conjunction with the accompanying drawings.

In this respect, before explaining the current embodiments of the decorative door panel insert in detail, it is to be understood that the decorative door panel insert is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the decorative door panel insert.

It is therefore important that the claims be regarded as including such equivalent construction insofar as they do not depart from the spirit and scope of the decorative door panel insert. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
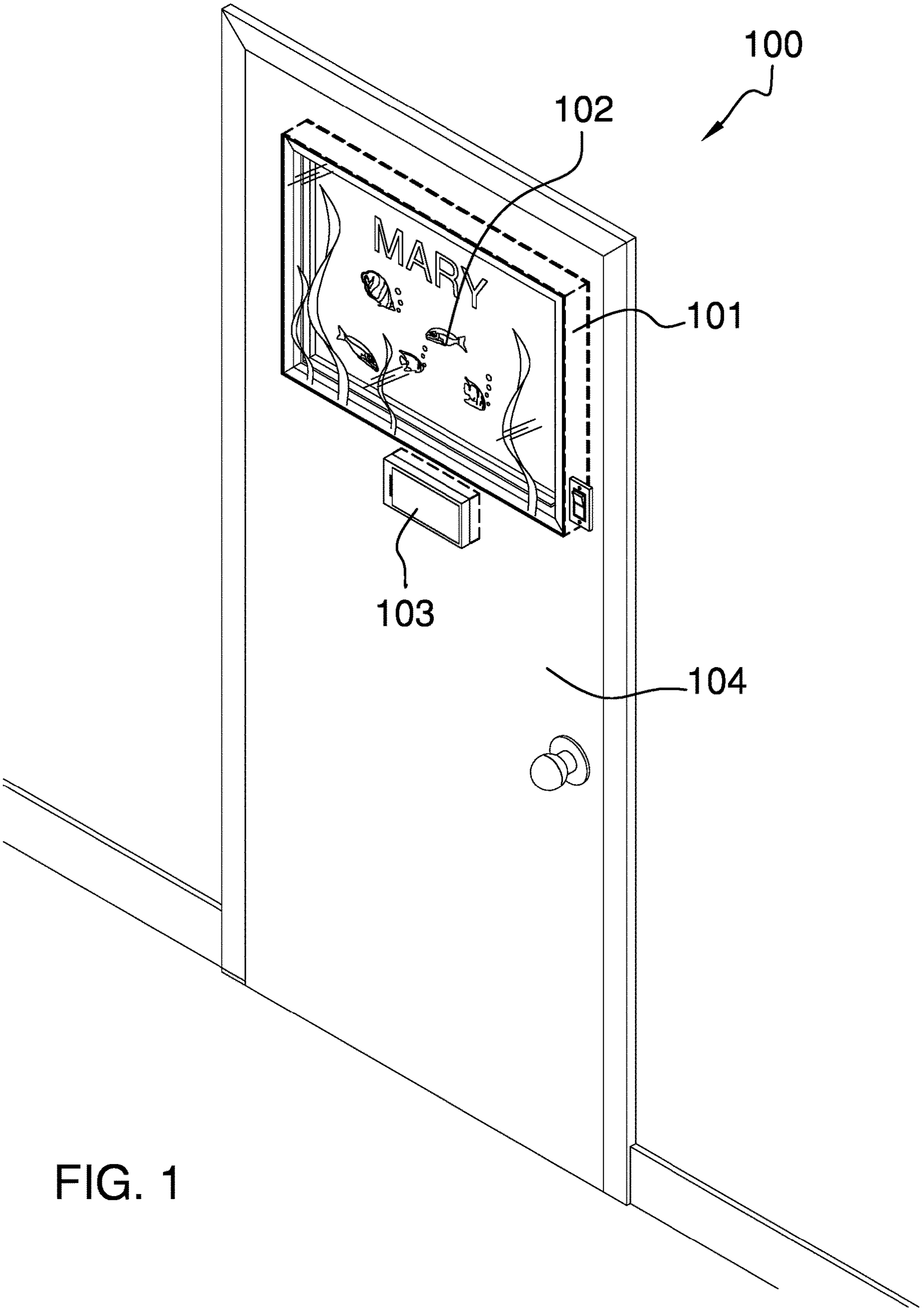
FIG. 1 is a perspective view of an embodiment of the disclosure.
Figure 2:
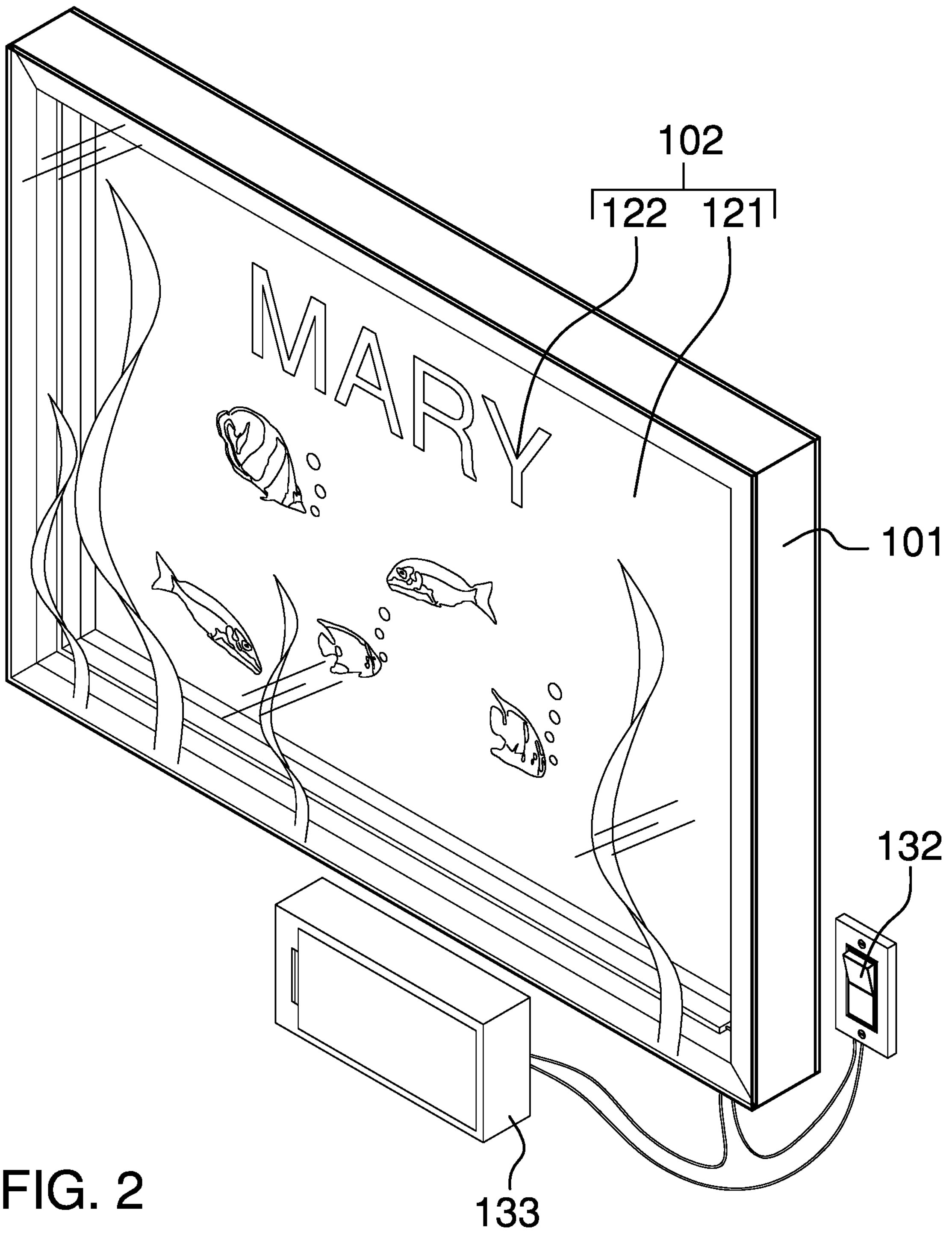
FIG. 2 is a perspective view of an embodiment of the disclosure.
Figure 3:
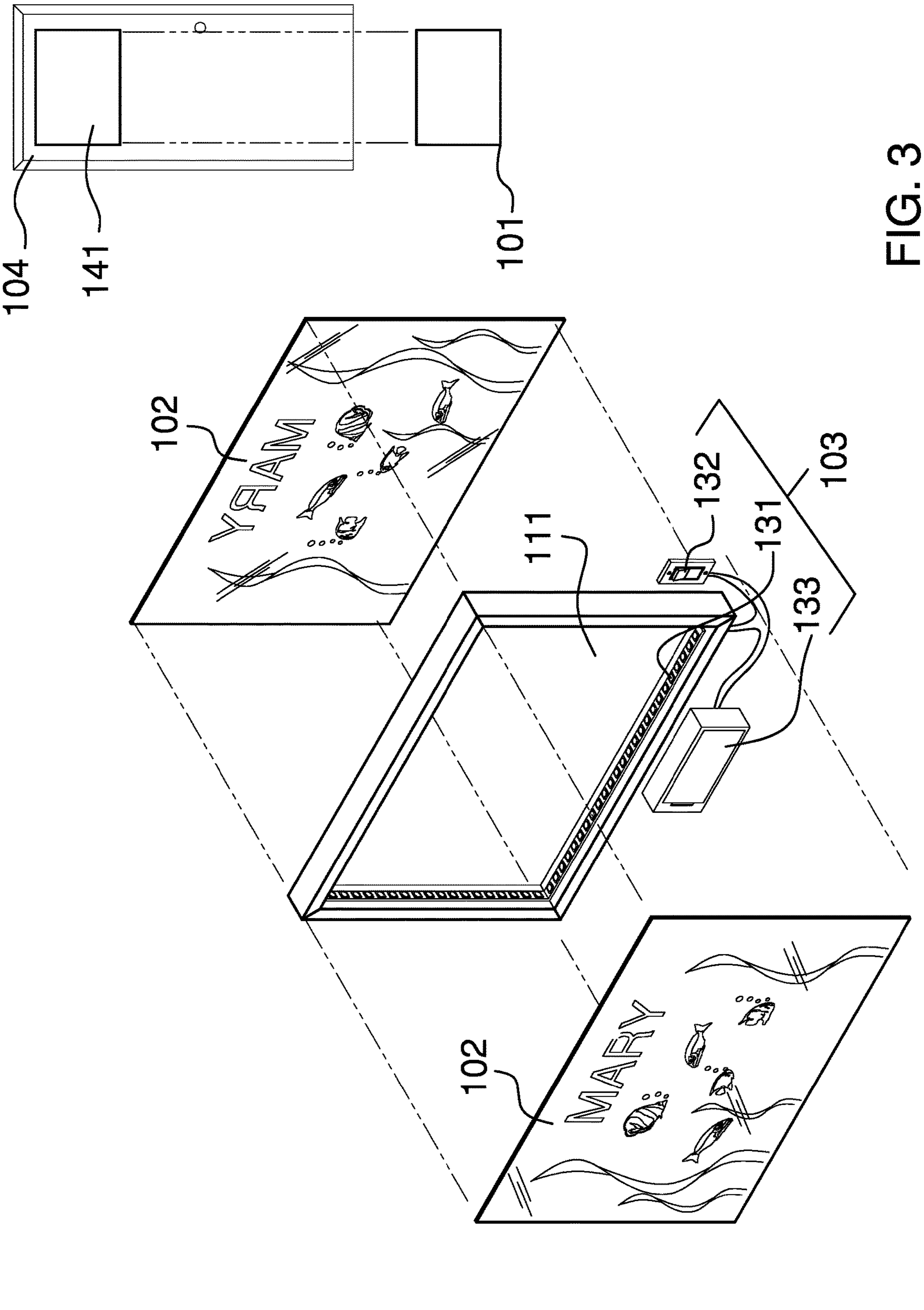
FIG. 3 is an exploded view of an embodiment of the disclosure.
Figure 4:
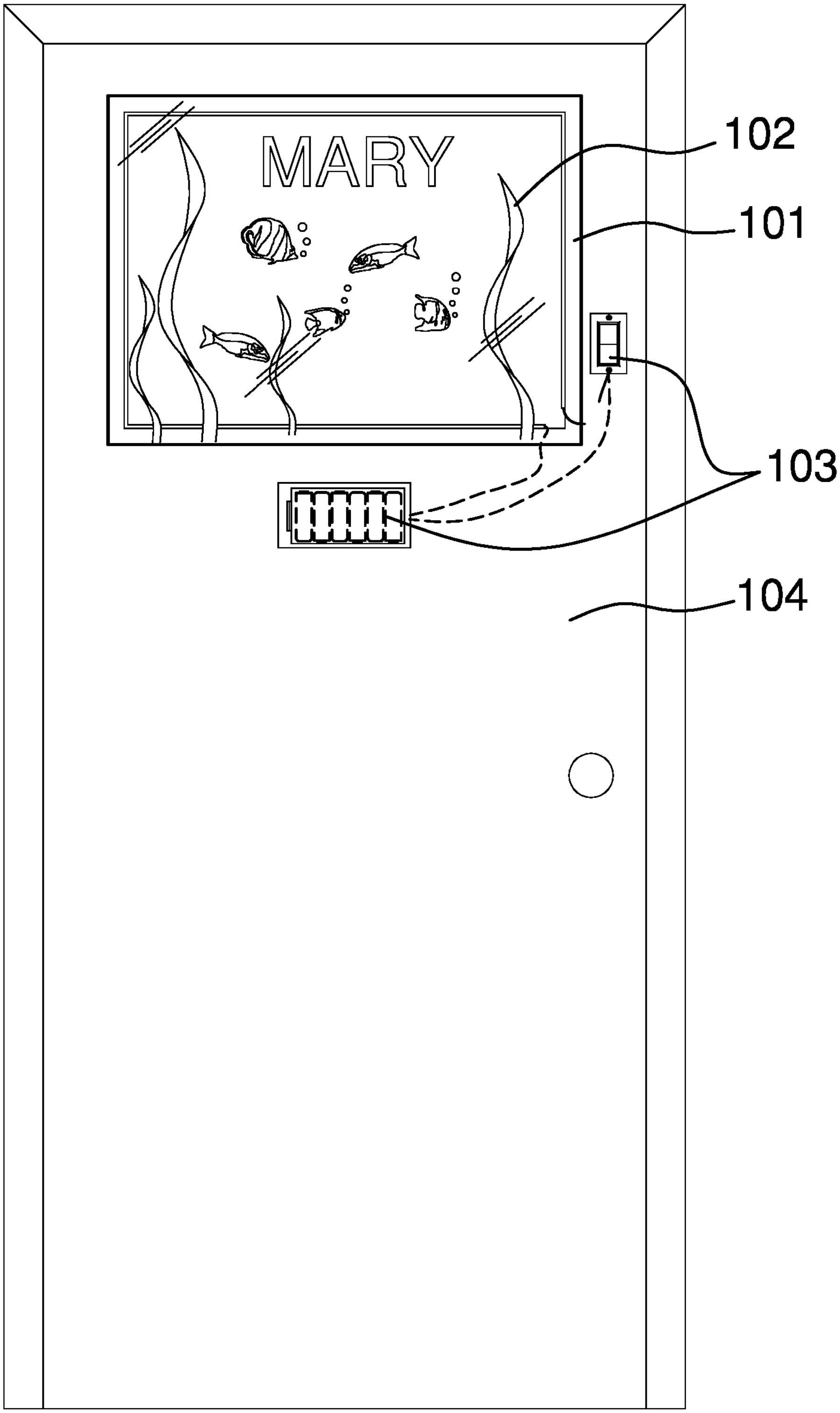
FIG. 4 is a front view of an embodiment of the disclosure.
Figure 5:
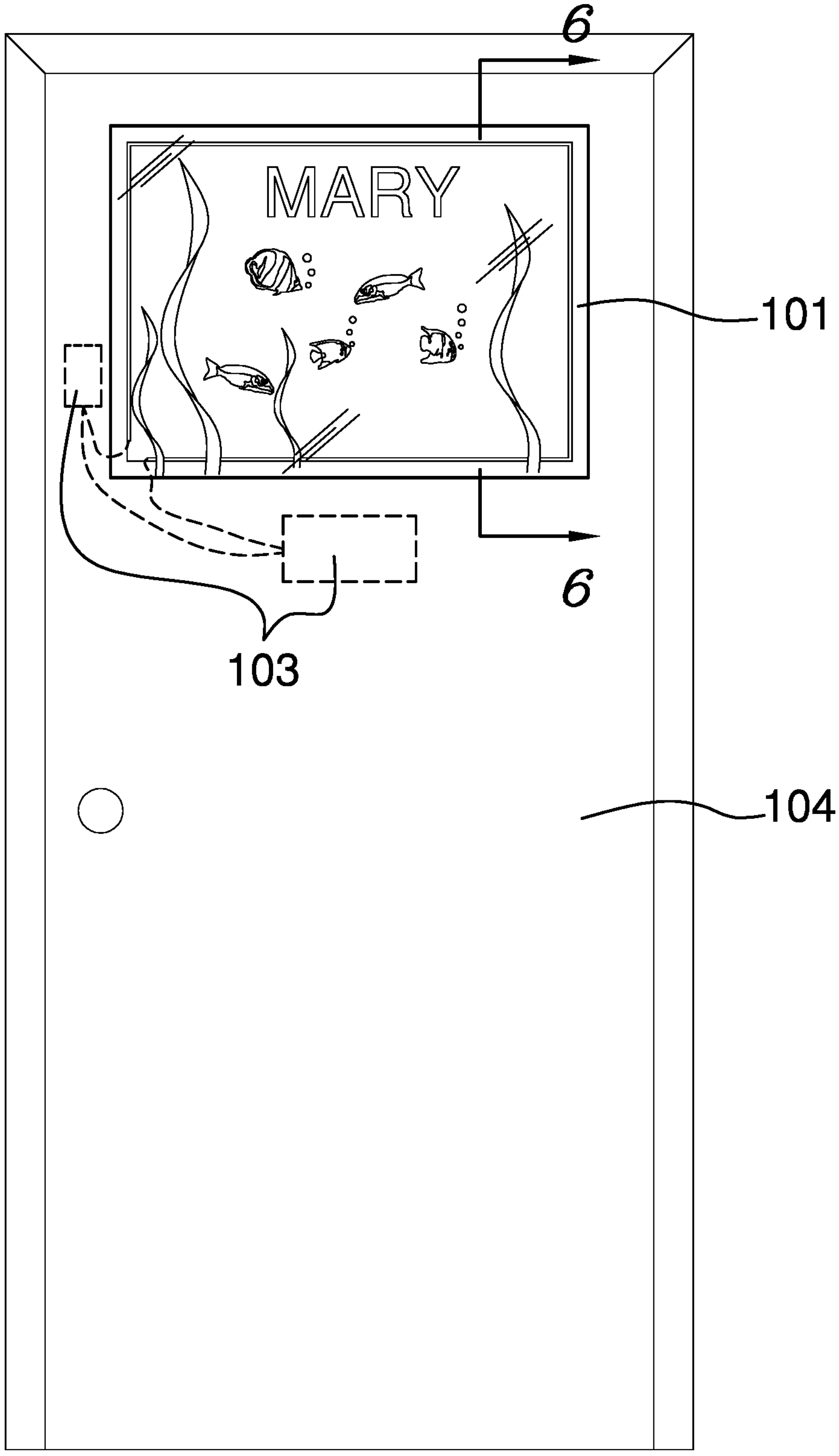
FIG. 5 is a front view of an embodiment of the disclosure.
Figure 6:
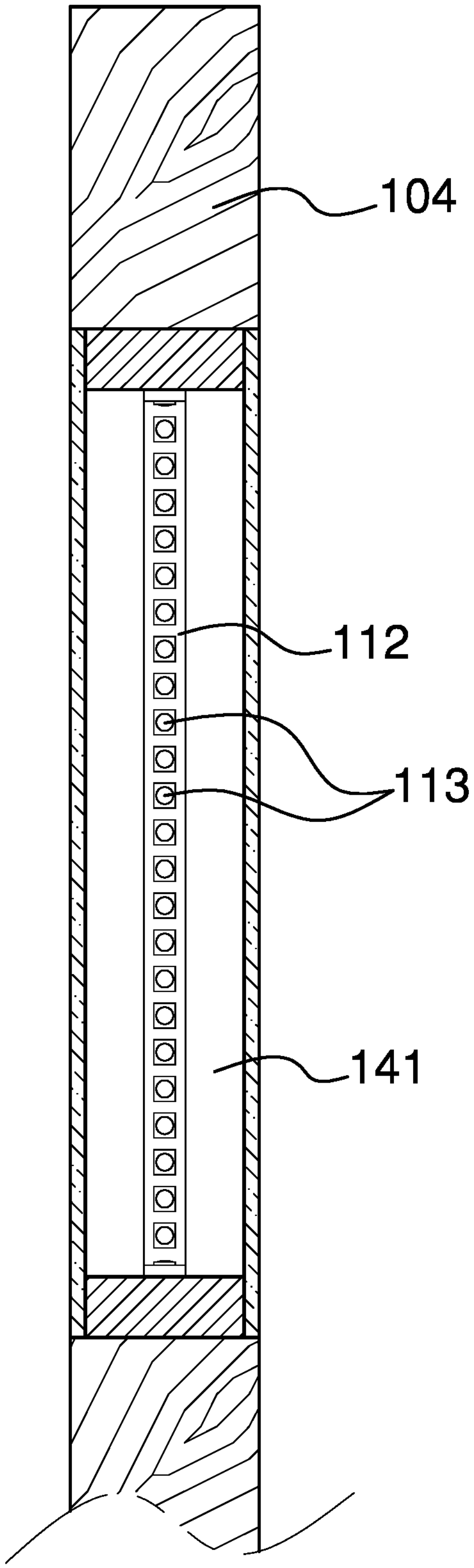
FIG. 6 is a cross-sectional view of an embodiment of the disclosure across 6-6 as shown in FIG. 5.

Detailed reference will now be made to one or more potential embodiments of the disclosure, which are illustrated in FIGS. 1 through 6.

The decorative door panel insert 100 (hereinafter invention) comprises a frame structure 101, an image panel 102, an illumination circuit 103, and a door 104. The image panel 102 mounts in the frame structure 101. The illumination circuit 103 mounts in the frame structure 101. The frame structure 101 mounts in the door 104. The image panel 102 displays an image. The illumination circuit 103 illuminates the image panel 102. The image panel 102 is a transparent structure.

The door 104 is a rigid structure. The door 104 is a barrier structure. The door 104 is a rotating structure. The door 104 rotates between a closed position and an open position. The door 104 mounts in a chamber aperture. The door 104 controls access through the chamber aperture. The door 104 controls access into and out of the chamber that is accessed through the chamber aperture. The door 104 further comprises a window aperture 141. The window aperture 141 is a negative space that is formed through the congruent ends of the disk structure of the door 104. The window aperture 141 allows for visibility through the door 104.

The frame structure 101 is a ring shaped structure. The frame structure 101 is geometrically similar to the window aperture 141 formed through the door 104. The frame structure 101 mounts in the window aperture 141. The frame structure 101 is geometrically similar to the image panel 102. The frame structure 101 forms a framework that secures the image panel 102 to the window aperture 141 formed through the door 104. The frame structure 101 comprises a panel aperture 111 and an illumination channel 112.

The panel aperture 111 is a negative space that is formed through the congruent ends of the disk structure of the frame structure 101. The panel aperture 111 forms the negative space through the frame structure 101 that is characteristic of a ring structure. The image panel 102 mounts in the panel aperture 111 of the frame structure 101 such that the image panel 102 encloses the negative space formed by the panel aperture 111.

The illumination channel 112 is a channel that is formed in the panel aperture 111. The illumination channel 112 is formed in the perimeter of the negative space formed by the panel aperture 111. The illumination channel 112 contains the led string 131 of the illumination circuit 103. The led string 131 is described elsewhere in this disclosure.

The image panel 102 is a transparent structure. The image panel 102 is geometrically similar to the panel aperture 111 of the frame structure 101. The image panel 102 is sized such that the image panel 102 mounts in the panel aperture 111. The frame structure 101 secures the image panel 102 in the window aperture 141 formed through the door 104. The image panel 102 comprises a transparent plate 121 and an image 122.

The transparent plate 121 is a transparent structure. The transparent plate 121 is geometrically similar to the panel aperture 111 to the frame structure 101. The transparent plate 121 mounts into the panel aperture 111 such that the frame structure 101 secures the transparent plate 121 within the window aperture 141 formed through the door 104.

The image 122 is a visual presentation of one or more indicia. The image 122 is visually displayed with in the window aperture 141 formed through the door 104. The image 122 forms an overlay that allows for visibility through the transparent plate 121 and the transparent plate 121 into and out of the chamber. The indicia presented by the image 122 is intended to stimulate a sentiment in the viewer.

The illumination circuit 103 is an electric circuit. The illumination circuit 103 converts electric energy into an illumination. The illumination generated by the illumination circuit 103 illuminates the image panel 102 within the frame structure 101. The illumination circuit 103 comprises a led string 131, a power switch 132, and an external power source 133. The led string 131, the power switch 132, and the external power source 133 are electrically connected in a series circuit.

The led string 131 is an electric circuit. The led string 131 converts electric energy into the illumination used to illuminate the image panel 102. The led string 131 physically generates the illumination used to illuminate the image 122 of the transparent plate 121. The led string 131 mounts in the illumination channel 112 of the frame structure 101.

The power switch 132 is an electric circuit element. The power switch 132 is a maintained switch. The power switch 132 controls the flow of electric energy through the series circuit formed by the led string 131, the power switch 132, and the external power source 133. The power switch 132 illuminates and extinguishes the illumination of the illumination circuit 103. The external power source 133 is an externally provided source of electric energy. In the first potential embodiment of the disclosure, the external power source 133 is a battery.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Aperture: As used in this disclosure, an aperture is a prism-shaped negative space that is formed completely through a structure or the surface of a hollow structure.

Battery: As used in this disclosure, a battery is a chemical device consisting of one or more cells, in which chemical energy is converted into electricity and used as a source of power. Batteries are commonly defined with a positive terminal and a negative terminal.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable space within a building.

Channel: As used in this disclosure, a channel is a negative space used to guide the position of an object of within a larger structure.

Closed Position: As used in this disclosure, a closed position refers to a movable barrier structure that is in an orientation that prevents passage through a port or an aperture. The closed position is often referred to as an object being "closed."

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Door: As used in this disclosure, a door is a movable or removable barrier that is attached to a chamber for the purpose of allowing or preventing access through an aperture into the chamber.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Extinguish: As used in this disclosure, to extinguish means to cause a device to stop generating an illumination.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Frame: As used in this disclosure, a frame is a structure or a first sub-structure: a) to which an object or a second sub-structure attaches; and, b) which forms a portion of the load path of the object or the second sub-structure.

Framework: As used in this disclosure, a framework refers to a second object or structure that encloses a first object or structure.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Illumination: As used in this disclosure, illumination refers to electromagnetic radiation contained with an area. Illumination is a synonym for light, particularly in cases where a measure of the amount of visible electromagnetic radiation in a space is called for. The verb form of illumination is to illuminate and is taken to mean the generation of an illumination.

Image: As used in this disclosure, an image is an optical representation or reproduction of an indicia or of the appearance of something or someone. See indicia sentiment optical character recognition. See Label.

Indicia: As used in this disclosure, the term indicia refers to a set of markings that identify a sentiment. See sentiment.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

LED: As used in this disclosure, an LED is an acronym for a light emitting diode. A light emitting diode is a diode that is also a light source.

LED Rope: As used in this disclosure, an LED rope is a commercially available lighting device. The LED rope is uses LEDs to illuminate a space. The LED rope is a flexible cord structure. The illuminating LEDs are distributed along the span of the length of the cord. The LED rope mounts on a surface. The flexible nature of the LED rope allows the LED rope to bend around corners during installation. The LED rope draws power from the national electric grid. While there are minor technical differences, this definition is intended to include LED rope like products commonly marketed as LED strips.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Maintained Switch: As used in this disclosure, a maintained switch is a switch that maintains the position that was set in the most recent switch actuation. A maintained switch works in an opposite manner to a momentary switch.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Overlay: As used in this disclosure, an overlay refers to the placement of a second structure over a first structure such that a portion of first structure is visible through the second structure.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ring: As used in this disclosure, a ring is a term that is used to describe a disk-like structure through which a negative space is formed through the faces of the disk-like structure. Rings are often considered loops.

Sentiment: As used in this disclosure, a sentiment refers to a symbolic meaning or message that is communicated through the use of an object or an image, potentially including a text based image. See image and optical character recognition.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure. The linear structure is often referred to as a daisy chain.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transparent: As used in this disclosure, transparent refers to a material that allows light to pass through the material without significant scattering such that an object can be clearly seen through the material.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A decorative door panel insert comprising
a frame structure, an image panel, an illumination circuit, and a door;
wherein the image panel mounts in the frame structure;
wherein the illumination circuit mounts in the frame structure;
wherein the frame structure mounts in the door;
wherein the door is configured for use with a building;
wherein the door further comprises a window aperture;
wherein the window aperture is a negative space that is formed through congruent ends of the door;
wherein the frame structure mounts in the window aperture;
wherein the frame structure forms a framework that secures the image panel to the window aperture;
wherein the image panel is sized such that the image panel mounts in a panel aperture;
wherein the frame structure secures the image panel in the window aperture;
wherein the image panel comprises a transparent plate and an image;
wherein the transparent plate is a disk shaped structure;
wherein the transparent plate is a transparent structure;
wherein the transparent plate is geometrically similar to the panel aperture to the frame structure;
wherein the transparent plate mounts into the panel aperture such that the frame structure secures the transparent plate within the window aperture formed through the door;
wherein the image is a visual presentation of one or more indicia;
wherein the image is visually displayed with in the window aperture formed through the door;
wherein the image forms an overlay that allows for visibility through the transparent plate and the transparent plate into and out of a chamber;
wherein the panel aperture is provided on an upper half of the door;
wherein the frame structure comprises the panel aperture and an illumination channel;
wherein the illumination circuit comprises a LED string, a power switch, and an external power source;
wherein the LED string, the power switch, and the external power source are electrically connected in a series circuit;
wherein the power switch is provided on the door and adjacent to the window aperture;
wherein the external power source is provided on the door and adjacent to the window aperture;
wherein the panel aperture is a negative space that is formed through congruent ends of the frame structure;
wherein the panel aperture forms the negative space through the frame structure that is characteristic of a ring structure;
wherein the image panel mounts in the panel aperture of the frame structure such that the image panel encloses the negative space formed by the panel aperture;
wherein the illumination channel is a channel that is formed in the panel aperture;
wherein the illumination channel is formed in the perimeter of the negative space formed by the panel aperture;
wherein the LED string mounts in the illumination channel of the frame structure.

2. The decorative door panel insert according to claim 1
wherein the image panel displays the image;
wherein the illumination circuit illuminates the image panel.

3. The decorative door panel insert according to claim 2
wherein the door is a rigid structure;
wherein the door is a barrier structure;
wherein the door is a rotating structure;
wherein the door rotates between a closed position and an open position;
wherein the door mounts in a chamber aperture;
wherein the door controls access through the chamber aperture;
wherein the door controls access into and out of the chamber that is accessed through the chamber aperture.

4. The decorative door panel insert according to claim 3
wherein the illumination circuit is an electric circuit;
wherein the illumination circuit converts electric energy into an illumination;
wherein the illumination generated by the illumination circuit illuminates the image panel within the frame structure.

5. The decorative door panel insert according to claim 4
wherein the LED string is an electric circuit;
wherein the LED string converts electric energy into the illumination used to illuminate the image panel;
wherein the LED string physically generates the illumination used to illuminate the image of the transparent plate;
wherein the LED string mounts in the illumination channel of the frame structure.

6. The decorative door panel insert according to claim 5
wherein the power switch is an electric circuit element;
wherein the power switch is a maintained switch;
wherein the power switch controls a flow of electric energy through the series circuit formed by the LED string, the power switch, and the external power source;
wherein the power switch illuminates and extinguishes the illumination of the illumination circuit.

7. The decorative door panel insert according to claim 6, wherein the external power source is an externally provided source of electric energy.

* * * * *